(12) United States Patent
Awasthi et al.

(10) Patent No.: US 8,732,343 B1
(45) Date of Patent: May 20, 2014

(54) SYSTEMS AND METHODS FOR CREATING DATALESS STORAGE SYSTEMS FOR TESTING SOFTWARE SYSTEMS

(75) Inventors: Nirendra Awasthi, Maharashtra (IN); Raghavendra Jorapur, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 88 days.

(21) Appl. No.: 12/639,272

(22) Filed: Dec. 16, 2009

(51) Int. Cl.
*G06F 3/00* (2006.01)
*G06F 9/44* (2006.01)

(52) U.S. Cl.
CPC ................................. *G06F 9/4411* (2013.01)
USPC ............................................................ 710/8

(58) Field of Classification Search
None
See application file for complete search history.

(56) References Cited

U.S. PATENT DOCUMENTS

| | | | | |
|---|---|---|---|---|
| 5,802,297 | A * | 9/1998 | Engquist | 709/212 |
| 7,308,545 | B1 * | 12/2007 | Kekre et al. | 711/162 |
| 7,941,455 | B2 * | 5/2011 | Wanigasekara-Mohotti et al. | 707/802 |
| 2005/0071379 | A1 * | 3/2005 | Kekre et al. | 707/200 |
| 2006/0143148 | A1 * | 6/2006 | Degtyar et al. | 707/1 |
| 2008/0022155 | A1 * | 1/2008 | Wack | 714/40 |
| 2008/0098135 | A1 * | 4/2008 | Young et al. | 710/58 |
| 2008/0276020 | A1 * | 11/2008 | Ching et al. | 710/106 |
| 2009/0064157 | A1 * | 3/2009 | Bar-Or et al. | 718/104 |
| 2009/0177721 | A1 * | 7/2009 | Mimatsu | 707/205 |
| 2009/0177836 | A1 * | 7/2009 | Mimatsu | 711/111 |
| 2009/0319567 | A1 * | 12/2009 | Frazer et al. | 707/103 Y |
| 2010/0095059 | A1 * | 4/2010 | Kisley et al. | 711/114 |
| 2010/0306494 | A1 * | 12/2010 | DeVilbiss et al. | 711/170 |
| 2011/0029728 | A1 * | 2/2011 | Popovski et al. | 711/114 |
| 2011/0078682 | A1 * | 3/2011 | Doan et al. | 718/1 |

OTHER PUBLICATIONS

Generic SCSI Target Subsystem for Linux; http://scst.sourceforge.net/; Taken from site on Dec. 8, 2009.

* cited by examiner

*Primary Examiner* — Henry Tsai
*Assistant Examiner* — Aurangzeb Hassan
(74) *Attorney, Agent, or Firm* — ALG Intellectual Property, LLC

(57) ABSTRACT

An exemplary computer-implemented method for creating dataless file systems that may be used to accurately test the performance and/or scalability of software systems may include creating a dataless storage system that: 1) fulfills I/O requests that are directed to software system metadata but 2) ignores I/O requests that are not directed to software system metadata (such as I/O requests directed to user data). The method may also include testing at least one aspect of a software system using the dataless storage system. Corresponding systems and computer-readable media are also disclosed.

19 Claims, 5 Drawing Sheets

SYSTEMS AND METHODS FOR CREATING DATALESS STORAGE SYSTEMS FOR TESTING SOFTWARE SYSTEMS

BACKGROUND

In order to accurately test the performance and/or scalability of certain software systems (such as file systems and logical volume managers), software test engineers may be required to test such software systems using extremely robust input-output (I/O) subsystems. For example, in order to accurately identify potential limitations and/or defects in a software system, as opposed to merely highlighting the limitations and/or deficiencies of the underlying I/O subsystem (such as I/O bottlenecks), software test engineers may be required to build an I/O subsystem that includes potentially hundreds of high-quality and high-speed physical storage devices and units of memory.

Unfortunately, building an I/O subsystem that is sufficiently robust to detect potential performance and/or scalability issues in certain large-scale software systems may prove extremely costly and time-consuming. As such, the instant disclosure identifies a need for systems and methods for accurately and inexpensively testing various aspects of software systems, such as file systems and logical volume managers.

SUMMARY

As will be described in greater detail below, the instant disclosure generally relates to systems and methods for creating dataless storage systems that may be used to accurately test the performance and/or scalability of software systems, such as file systems and logical volume managers. In one example, one or more of the exemplary systems described herein may perform such a task by creating a dataless storage system that: 1) fulfills I/O requests that are directed to software system metadata (in order to, e.g., maintain the structure and consistency of a software system, such as a file system or logical volume manager) but 2) ignores all other I/O requests (such as I/O requests for user data within the software system) in order to, e.g., eliminate read/write latencies associated with accessing such user data. The systems described herein may then test at least one aspect of a software system (such as the performance and/or scalability of a file system or logical volume manager) using the dataless storage system.

In some examples, the dataless storage system may include at least one storage device (e.g., a physical or emulated SCSI target, such as one or more emulated logical unit numbers (LUNs)) for fulfilling I/O requests that are directed to software system metadata. The dataless storage system may also include at least one virtual null device (i.e., a virtual device-like entity that delivers no input when read from, and discards all output when written to) for ignoring all other I/O requests (such as I/O requests directed to user data). The storage device and the virtual null device may represent portions of a single storage system or device or a plurality of storage systems or devices.

In some examples, the software system may be configured to identify and separately direct I/O requests to specific devices based on whether the I/O requests are directed to software system metadata or user data. For example, the systems described herein may create the dataless storage system by configuring the software system (which may, as explained below, represent a multi-device file system or logical volume manager) to: 1) direct all I/O requests for metadata within the software system to the logical or physical storage device(s) within the dataless storage system and 2) direct all other I/O requests (such as I/O requests for user data within the software system) to the virtual null device(s) within the dataless storage system. In these examples, the dataless storage system may also include a device driver (such as a physical or virtual SCSI driver) for interfacing between the software system and the storage device and virtual null device.

In some examples, the storage device may fulfill I/O requests by reading, writing, and/or deleting software system metadata from or to the storage device. In contrast, the virtual null device may ignore I/O requests by discarding user-data write requests and/or by providing null responses to user-data read requests. Examples of null responses that the virtual null device may return include logical zeros and/or preconfigured patterns of data.

As will be explained in detail below, by creating a dataless storage system that fulfills I/O requests that are directed to software system metadata but ignores I/O requests that are directed to user data, the systems and methods described herein may enable software test engineers to create a dataless storage system that avoids I/O bottlenecks. As explained below, this dataless storage system may enable software test engineers to test the performance and/or scalability of software systems without investing the substantial amounts of time and money that are typically required to create sufficiently robust test I/O subsystems.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
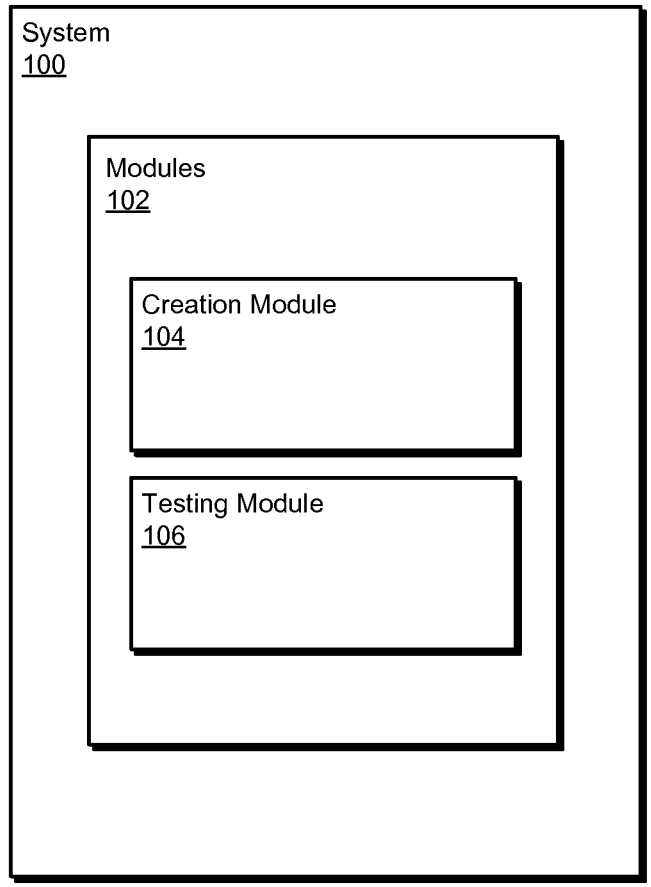
FIG. 1 is a block diagram of an exemplary system for creating dataless storage systems for testing software systems.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
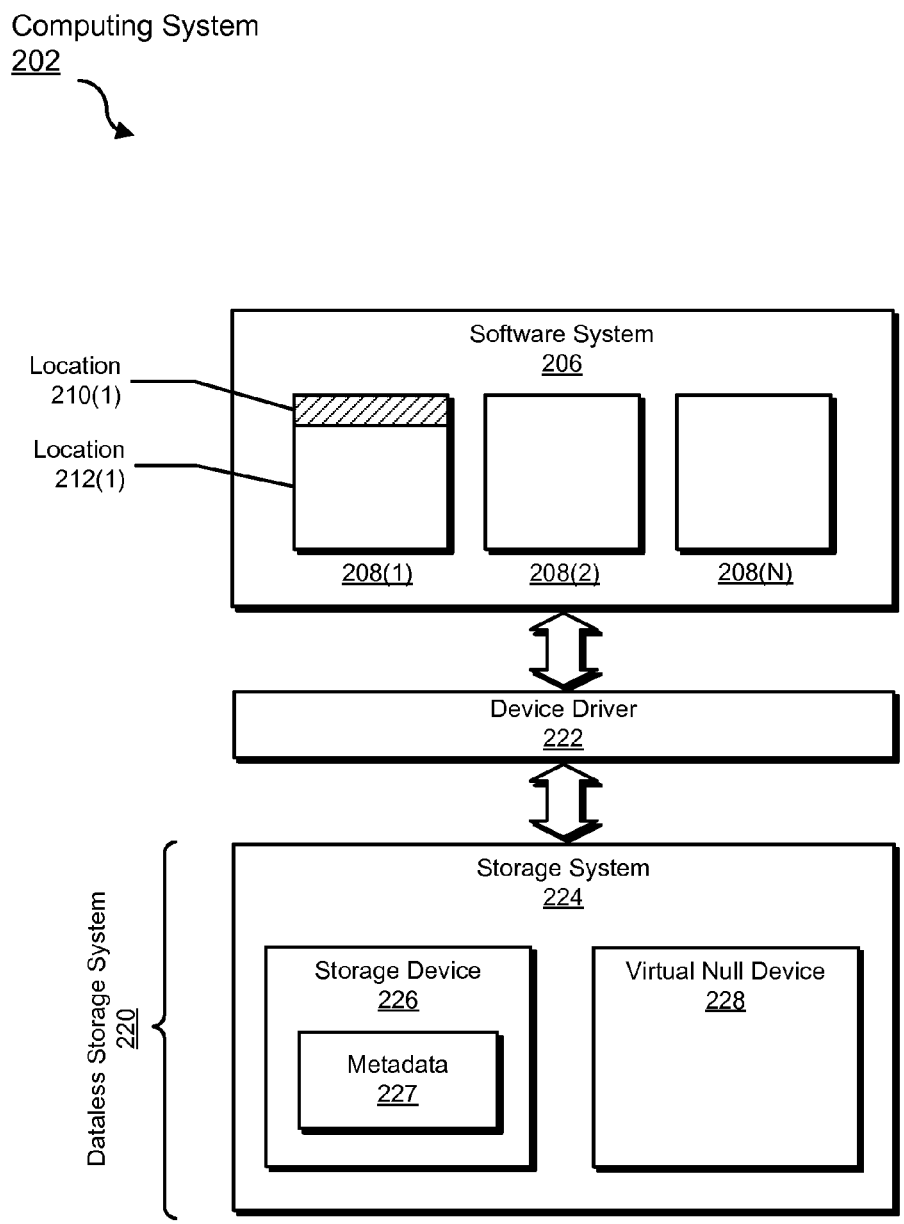
FIG. 2 is a block diagram of an exemplary system for creating dataless storage systems for testing software systems.

The following will provide, with reference to FIGS. 1 and 2, detailed descriptions of exemplary systems for creating dataless storage systems for testing software systems. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for creating dataless storage systems for testing software systems. As illustrated in this figure, exemplary system 100 may include one or more modules 102 for performing one or more tasks. For example, and as will be explained in greater detail below, exemplary system 100 may include a creation module 104 programmed to create a dataless storage system configured to fulfill I/O requests that are directed to software system metadata but ignore I/O requests that are directed to user data. Exemplary system 100 may also include a testing module 108 programmed to test at least one aspect of a software system (such as the performance and/or scalability of a file system or logical volume manager) using the dataless storage system. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as computing system 202 in FIG. 2, computing system 410 in FIG. 4, and/or portions of exemplary network architecture 500 in FIG. 5. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary computing system 202 in FIG. 2. As shown in FIG. 2, computing system 202 may include a software system 206 in communication with a dataless storage system 220 via a device driver 222. In one embodiment, and as will be described in greater detail below, dataless storage system 220 may be configured to: 1) fulfill I/O requests that are directed to software system metadata (in order to, e.g., maintain the structure and consistency of software system 206, which may represent a file system or logical volume manager) but 2) ignore I/O requests that are directed to user data (in order to, e.g., eliminate read/write latencies associated with accessing user data within software system 206).

For example, when testing the performance and/or scalability of software system 206, dataless storage system 220 may: 1) fulfill I/O requests from software system 206 (initiated either by software system 206 or by a software product accessing software system 206) that are directed to location 210(1) of volume 208(1) within software system 206 (which location may, as explained below, correspond to software system metadata) but 2) ignore I/O requests from software system 206 that are directed to location 212(1) of volume 208(1) within software system 206 (which location may, as explained below, correspond to user data).

Computing system 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 410 in FIG. 4, or any other suitable computing device.

Software system 206 generally represents any type or form of system or method for organizing files and data. Examples of software system 206 include, without limitation, logical volume managers (such as VERITAS VOLUME MANAGER), file systems (e.g., journaling file systems and/or multi-device file systems, such as VERITAS FILE SYSTEM), backup applications, or the like. In one example, software system 206 may represent a multi-device file system (i.e., a software system that is capable of separating and storing data on multiple storage devices).

In one example, software system 206 may organize and/or maintain the physical and/or logical location of files and data stored in storage system 224. For example, software system 206 may contain a plurality of volumes 208(1)-208(N) backed by storage (either logical or physical) on storage system 224.

Device driver 222 generally represents any type or form of software module or hardware device capable of creating or interfacing with virtual or emulated storage devices. Examples of device driver 222 include, without limitation, SCSI drivers (configured, for example, to translate SCSI commands to and/or from physical or emulated SCSI devices), iSCSI drivers (configured, for example, to translate iSCSI commands to and/or from physical or emulated iSCSI devices), Fibre Channel drivers (configured, for example, to translate Fibre Channel commands to and/or from physical or emulated Fibre Channel devices), or the like.

Storage system 224 generally represents any type or form of storage system or device (such as a disk array) capable of storing data. Storage system 224 may represent all or a portion of a single or a plurality of storage devices. In one example, storage system 224 may be physically or logically divided into a storage device 226 and a virtual null device 228.

Storage device 226 generally represents any type or form of physical, logical, virtual, or emulated storage device. Examples of storage device 226 include, without limitation, physical or virtual SCSI targets (such as one or more physical or emulated LUNs), physical or virtual iSCSI targets, physical or virtual Fibre Channel devices, or the like. In one example, and as will described in greater detail below, storage device 226 may be configured to fulfill I/O requests directed to software system metadata (such as software system metadata 227) generated by software system 206.

Virtual null device 228 generally represents any type or form of virtual device-like entity configured to deliver no input when read from and/or discard all output when written to. In one example, and as will be described in greater detail below, virtual null device 228 may be configured to ignore I/O requests that are directed to user data (i.e., data that is not required for operation of a file system) within software system 206 by, for example, discarding user-data write requests and/or providing null responses to user-data read requests.

In some examples, storage device 226 and virtual null device 228 may represent portions of a single storage system or device (such as storage system 224) or portions of a plurality of storage systems or devices. In the example illustrated in FIG. 2, virtual null device 228 may, when combined with storage device 226, represent dataless storage system 220.

Figure 3:
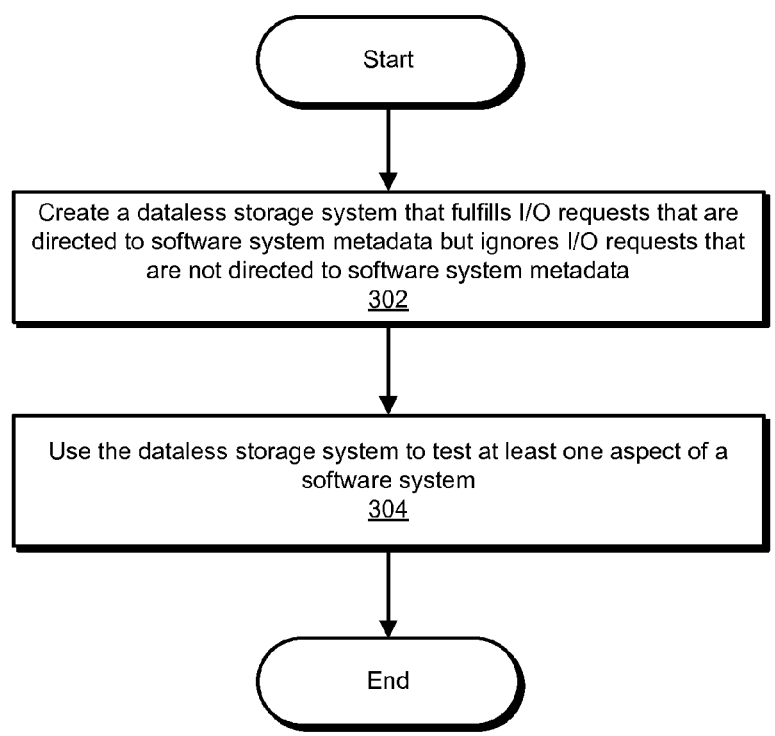
FIG. 3 is a flow diagram of an exemplary method for creating dataless storage systems for testing software systems.

FIG. 3 is a flow diagram of an exemplary computer-implemented method 300 for creating dataless storage systems for testing software systems. The steps shown in FIG. 3 may be performed by any suitable computer-executable code and/or computing system. In some embodiments, the steps shown in FIG. 3 may be performed by one or more of the components of system 100 in FIG. 1, computing system 200 in FIG. 2, computing system 410 in FIG. 4, and/or portions of network architecture 500 in FIG. 5.

As illustrated in FIG. 3, at step 302 one or more of the various systems described herein may create a dataless storage system that: 1) fulfills I/O requests that are directed to software system metadata but 2) ignores all other I/O requests (such as I/O requests directed to user data). For example, creation module 104 in FIG. 1 may, as part of computing system 202 in FIG. 2 or computing system 410 in FIG. 4, create a dataless storage system 220 that is configured to: 1) fulfill I/O requests from software system 206 (initiated either by software system 206 or by a software product accessing software system 206) that are directed to metadata within software system 206 but 2) ignore I/O requests from software system 206 that are directed to user data within software system 206.

The term "I/O request," as used herein, may refer to I/O requests that are initiated by a software system. In some examples, these I/O requests may be initiated by the software system itself. In other examples, a software system may initiate such I/O requests at the request of a software product utilizing the software system. In addition, the term "software system" may refer to any type or form of system for managing data (such as files or volumes). Examples of software systems include, without limitation, file systems and logical volume managers.

The terms "software system metadata" and/or "metadata," as used herein, may refer to data that is essential or required for proper operation of a software system (e.g., data required to maintain the structure and/or consistency of a file system or logical volume manager). In some examples, software system metadata may identify one or more properties of a software system or software system object, such as a file or volume. For example, software system metadata may identify the author, creation date, modified date, location, size, or any other property of a file within a file system. Similarly, software system metadata may refer to data that identifies one or more properties of a logical volume managed by a logical volume manager. In contrast, the term "user data" may refer to data that is not essential or required for proper operation of a software system (e.g., data that is not required to maintain the structure and/or consistency of a file system or logical volume manager). Examples of user data include, without limitation, file data and/or file contents.

The various systems described herein may perform step 302 in a variety of ways. In one example, the systems described herein may identify or create at least one storage device (e.g., a physical or emulated SCSI target, such as one or more emulated logical unit numbers (LUNs)) for fulfilling I/O requests that are directed to software system metadata. For example, creation module 104 in FIG. 1 may, as part of device driver 222 and/or as part of any other type or form of virtualization or emulation module or device, identify or create storage device 226 within storage system 224. As detailed above, storage device 226 generally represents any type or form of physical, logical, virtual, or emulated storage device. Examples of storage device 226 include, without limitation, physical or virtual SCSI targets, physical or virtual iSCSI targets, physical or virtual Fibre Channel devices, or the like. In one example, and as will described in greater detail below, storage device 226 may be configured to store software system metadata (such as software system metadata 227) generated by software system 206.

In some embodiments, the various systems described herein may also create at least one virtual null device (i.e., a virtual device-like entity that delivers no input when read from, and discards all output when written to) for ignoring I/O requests directed to user data. For example, creation module 104 in FIG. 1 may, as part of device driver 222 and/or as part of any other type or form of virtualization or emulation module or device, create virtual null device 228 within storage system 224. As detailed above, virtual null device 228 may be configured to discard all user-data write requests and to deliver null responses to user-data read requests.

As detailed above, storage device 226 and virtual null device 228 may represent portions of a single storage system or device (such as storage system 224) or portions of a plurality of storage systems or devices. In the example illustrated in FIG. 2, virtual null device 228 may, when combined with storage device 226, represent dataless storage system 220.

In some examples, the various systems described herein may create the dataless storage system by configuring a software system to identify and separately direct I/O requests to specific devices based on whether the I/O requests are directed to software system metadata or user data. For example, creation module 104 in FIG. 1 may configure software system 206 in FIG. 2 (which may, as detailed above, represent a multi-device file system or logical volume manager) to: 1) direct all I/O requests for software system metadata to storage device 226 and 2) direct all other I/O requests (such as I/O requests for user data) to virtual null device 228.

In the above example, the systems described herein may also create a device driver for interfacing between the configured software system and the storage device and the virtual null device. For example, creation module 104 in FIG. 1 may create a device driver 222 in FIG. 2 for interfacing between software system 206 and the storage and null devices (e.g., storage device 226 and virtual null device 228) of dataless storage system 220. As detailed above, device driver 222 may represent any type or form of software module or hardware device capable of creating or interfacing with physical or emulated storage devices. Examples of device driver 222 include, without limitation, SCSI drivers (configured, for example, to translate SCSI commands to and/or from physical or emulated SCSI devices), iSCSI drivers (configured, for example, to translate iSCSI commands to and/or from physical or emulated iSCSI devices), Fibre Channel drivers (configured, for example, to translate Fibre Channel commands to and/or from physical or emulated Fibre Channel devices), or the like.

The dataless storage systems described herein may fulfill I/O requests that are directed to software system metadata in a variety of ways. For example, software system 206 may receive a request from a software product to read, write, or delete data to or from location 210(1) within volume 208(1). In this example, software system 206 may determine that location 210(1) corresponds to a location within software system 206 that contains software system metadata (such as a specific block range at the beginning or end of software system 206, such as a reserved area, that contains software system metadata).

Upon determining that location 210(1) corresponds to a location within software system 206 that contains software system metadata, software system 206 may direct an I/O request for the software system metadata within location 210(1) to storage device 226 within storage system 224 (since, as detailed above, software system 206 may be configured to direct I/O requests for software system metadata to storage device 226). In some examples, device driver 222 may then intercept, translate, and/or appropriately direct this metadata I/O request to storage device 226 within storage system 224.

Storage device 226 may then fulfill the metadata I/O request by reading the requested software system metadata (by, e.g., reading software system metadata 227 from storage device 226), writing the requested software system metadata (by, e.g., writing or modifying software system metadata 227 to storage device 226), or deleting the requested software system metadata (by, e.g., deleting software system metadata 227 from storage device 226).

As detailed above, in some examples the systems described herein may also configure the dataless file system to ignore all non-software-system-metadata I/O requests (such as I/O requests directed to user data). The dataless storage systems described herein may ignore I/O requests that are not directed to software system metadata in a variety of ways. For example, software system 206 may receive a request from a software product to read, write, or delete data to or from location 212(1) within volume 208(1). In this example, software system 206 may determine that location 212(1) corresponds to a location within software system 206 that contains user data.

Upon determining that location 210(1) corresponds to a location within software system 206 that contains user data, software system 206 may direct an I/O request for the user data within location 212(1) to virtual null device 228 within storage system 224 (since, as detailed above, software system 206 may be configured to direct I/O requests for user data to virtual null device 228). In some examples, device driver 222 may then intercept, translate, and/or appropriately direct this user-data I/O request to virtual null device 228 within storage system 224.

Virtual null device 228 may then ignore the user-data I/O request by, e.g., discarding the I/O request (if, e.g., the I/O request represents a write request) and/or providing a null response to the I/O request (if, e.g., the I/O request represents a read request). Examples of null responses that may be provided by virtual null device 228 include, without limitation, preconfigured patterns of data and/or logical zeros.

Returning to FIG. 3, at step 304 one or more of the various systems described herein may use the dataless storage system identified in step 302 to test at least one aspect of a software system. For example, testing module 106 in FIG. 1 may, as part of computing system 202 in FIG. 2, test the scalability and/or performance of software system 206 by causing software system 206 to read data from and/or write data to storage system 224 (by, e.g., directing I/O requests to dataless storage system 220 in the manner set forth above). Upon completion of step 304, exemplary method 300 in FIG. 3 may terminate.

The systems described herein may be used to test a variety of software systems. For example, the dataless storage systems disclosed herein may be used to test the performance and/or scalability of logical volume managers (such as the VERITAS VOLUME MANAGER), file systems (e.g., journaling file systems, such as the VERITAS FILE SYSTEM), backup applications, or the like.

As detailed above, by creating a dataless storage system that fulfills I/O requests that are directed to software system metadata but ignores I/O requests that are directed to user data, the systems and methods described herein may enable software test engineers to create a dataless file system that avoids I/O bottlenecks. As explained above, this dataless file system may enable software test engineers to test the performance and/or scalability of software systems without investing the substantial amounts of time and money that are typically required to create sufficiently robust test I/O subsystems.

Figure 4:
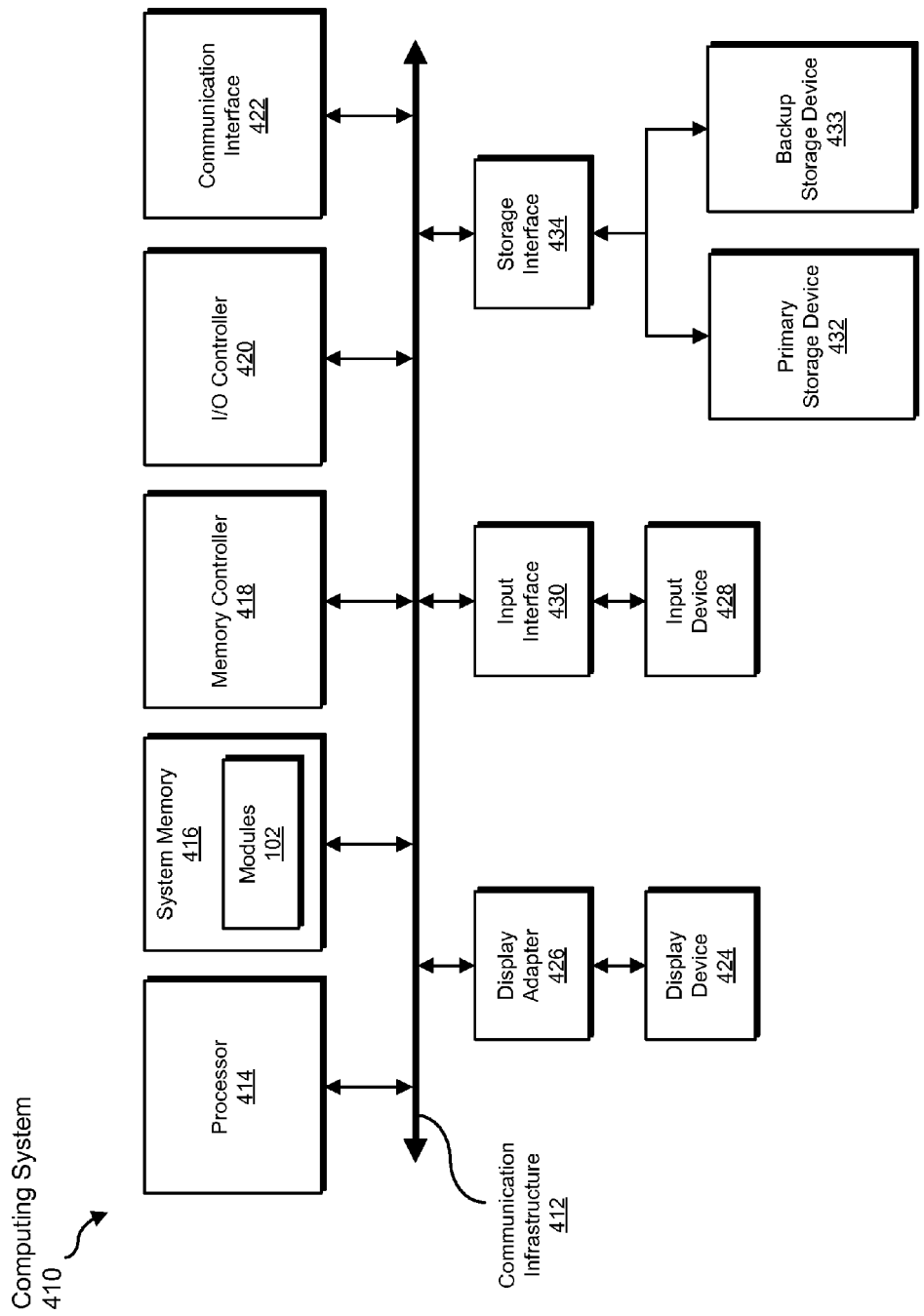
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of processing unit capable of processing data or interpreting and executing instructions. In certain embodiments, processor 414 may receive instructions from a software application or module. These instructions may cause processor 414 to perform the functions of one or more of the exemplary embodiments described and/or illustrated herein. For example, processor 414 may perform and/or be a means for performing, either alone or in combination with other elements, one or more of the creating, fulfilling, ignoring, using, testing, reading, writing, deleting, configuring, discarding, and providing steps described herein. Processor 414 may also perform and/or be a means for performing any other steps, methods, or processes described and/or illustrated herein.

System memory 416 generally represents any type or form of volatile or non-volatile storage device or medium capable of storing data and/or other computer-readable instructions. Examples of system memory 416 include, without limitation, random access memory (RAM), read only memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an ISA, PCI, PCIe, or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412. In certain embodiments, memory controller 418 may perform and/or be a means for performing, either alone or in combination with other elements, one or more of the steps or features described and/or illustrated herein, such as creating, fulfilling, ignoring, using, testing, reading, writing, deleting, configuring, discarding, and providing.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434. I/O controller 420 may be used, for example, to perform and/or be a means for performing, either alone or in combination with other elements, one or more of the creating, fulfilling, ignoring, using, testing, reading, writing, deleting, configuring, discarding, and providing steps described herein. I/O controller 420 may also be used to perform and/or be a means for performing other steps and features set forth in the instant disclosure.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution. In certain embodiments, communication interface 422 may perform and/or be a means for performing, either alone or in combination with other elements, one or more of the creating, fulfilling, ignoring, using, testing, reading, writing, deleting, configuring, discarding, and providing steps disclosed herein. Communication interface 422 may also be used to perform and/or be a means for performing other steps and features set forth in the instant disclosure.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device. In at least one embodiment, input device 428 may perform and/or be a means for performing, either alone or in combination with other elements, one or more of the creating, fulfilling, ignoring, using, testing, reading, writing, deleting, configuring, discarding, and providing steps disclosed herein. Input device 428 may also be used to perform and/or be a means for performing other steps and features set forth in the instant disclosure.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a floppy disk drive, a magnetic tape drive, an optical disk drive, a flash drive, or the like. Storage interface 434 generally represents any type or form of interface or device for transferring data between storage devices 432 and 433 and other components of computing system 410.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

In certain embodiments, storage devices 432 and 433 may be used, for example, to perform and/or be a means for performing, either alone or in combination with other elements, one or more of the creating, fulfilling, ignoring, using, testing, reading, writing, deleting, configuring, discarding, and providing steps disclosed herein. Storage devices 432 and 433 may also be used to perform and/or be a means for performing other steps and features set forth in the instant disclosure.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an application specific integrated circuit (ASIC) adapted to implement one or more of the exemplary embodiments disclosed herein.

Figure 5:
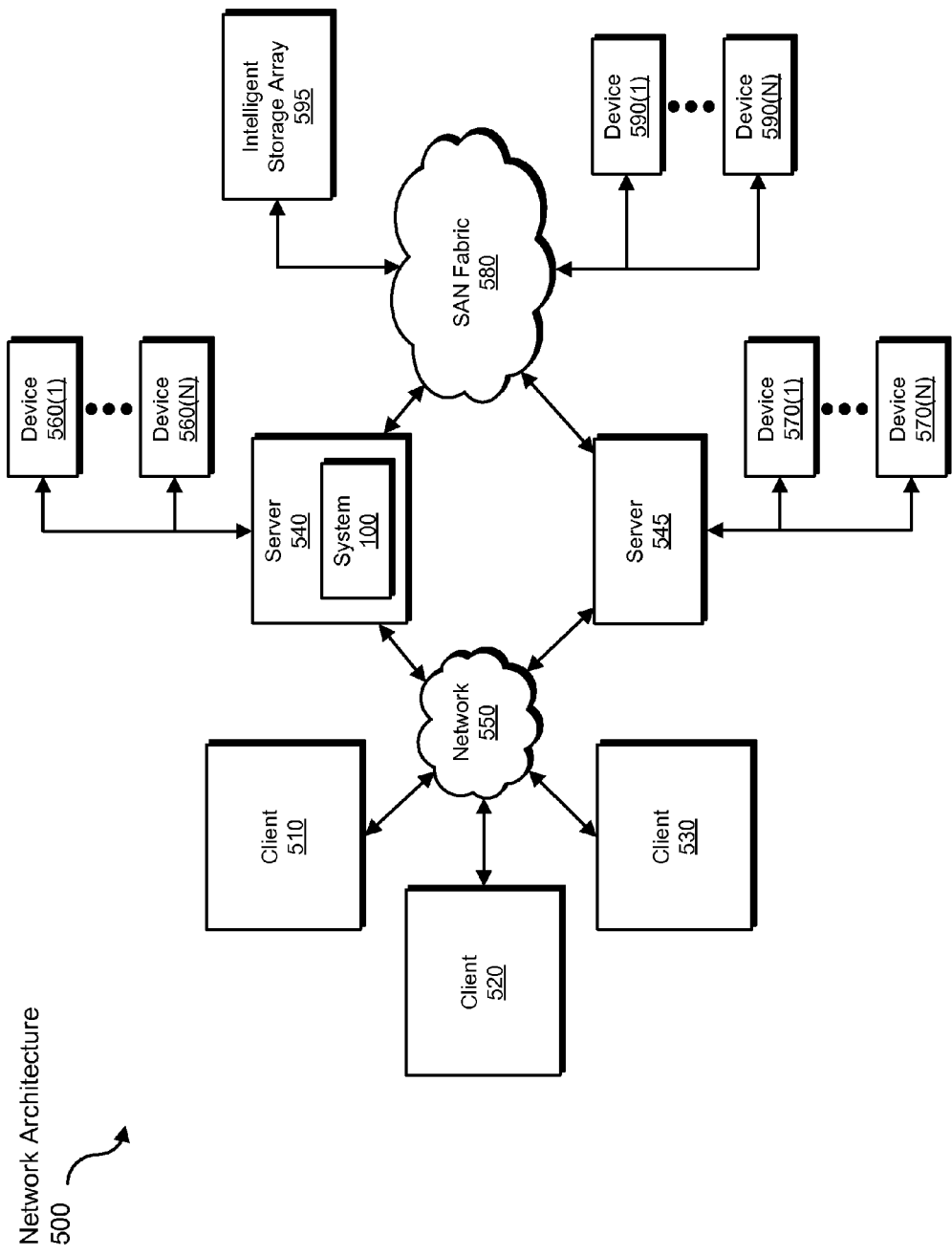
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. Client systems 510, 520, and 530 generally represent any type or form of computing device or system, such as exemplary computing system 410 in FIG. 4.

Similarly, servers 540 and 545 generally represent computing devices or systems, such as application servers or database servers, configured to provide various database services and/or run certain software applications. Network 550 generally represents any telecommunication or computer network including, for example, an intranet, a wide area network (WAN), a local area network (LAN), a personal area network (PAN), or the Internet. In one example, client systems 510, 520, and/or 530 and/or servers 540 and/or 545 may include system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent network-attached storage (NAS) devices configured to communicate with servers 540 and 545 using various protocols, such as NFS, SMB, or CIFS.

Servers 540 and 545 may also be connected to a storage area network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550. Accordingly, network architecture 500 may perform and/or be a means for performing, either alone or in combination with other elements, one or more of the creating, fulfilling, ignoring, using, testing, reading, writing, deleting, configuring, discarding, and providing steps disclosed herein. Network architecture 500 may also be used to perform and/or be a means for performing other steps and features set forth in the instant disclosure.

As detailed above, computing system 410 and/or one or more components of network architecture 500 may perform and/or be a means for performing, either alone or in combination with other elements, one or more steps of an exemplary method for creating dataless storage systems for testing software systems. In one example, such a method may include: 1) creating a dataless storage system that fulfills I/O requests that are directed to software system metadata but ignores I/O requests that are not directed to software system metadata and then 2) using the dataless storage system to test at least one aspect of a software system. In some examples, the I/O requests that are not directed to software system metadata may include I/O requests that are directed to user data.

In one example, creating the dataless storage system may include creating: 1) at least one storage device for fulfilling I/O requests that are directed to software system metadata and/or 2) at least one virtual null device for ignoring I/O requests that are directed to user data. In this example, the storage device may fulfill I/O requests that are directed to software system metadata by reading software system metadata from the storage device, writing software system metadata to the storage device, and/or deleting software system metadata from the storage device. In contrast, the virtual null device may ignore I/O requests that are directed to user data by discarding I/O requests to write user data and/or providing a null response to I/O requests to read user data. Examples of such null responses may include, without limitation, a pre-configured pattern of data and/or logical zeros.

In some examples, the storage device may include a SCSI target, an iSCSI target, or a Fibre Channel device. In addition, in some examples the storage device and the virtual null device may include portions of a single device. In some examples, using the dataless storage system to test at least one aspect of the software system may include using the dataless storage system to test the performance and/or scalability of the software system.

In one example, creating the dataless storage system may also include configuring the software system to direct I/O requests for metadata within the software system to the storage device and/or direct I/O requests for user data within the software system to the virtual null device. In this example, creating the dataless storage system may also include creating a device driver for interfacing between the software system and the storage device and the virtual null device. Examples of such a device driver include, without limitation, a physical or virtual SCSI driver, a physical or virtual iSCSI driver, and a physical or virtual Fibre Channel driver. Examples of the software system include, without limitation, a volume manager and a file system.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of modules 100 in FIG. 1 may transform a property or characteristic of computing system 202 in FIG. 2 by creating dataless storage system 220.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for creating dataless storage systems for testing software systems, at least a portion of the method being performed by a computing device comprising at least one processor, the method comprising:
    creating a dataless storage system that contains data that is required for the proper operation of software systems but omits all other data, the dataless storage system comprising:
        at least one storage device that fulfills I/O requests that are directed to software system metadata;
        at least one virtual null device that ignores I/O requests that are directed to user data, wherein the virtual null device ignores I/O requests directed to user data by:
            discarding write requests to write to user data; and
            providing null responses to read requests to read user data;
    using the dataless storage system to test at least one aspect of a software system by causing the software system to attempt to read data from and/or write data to the dataless storage system;
    determining that a location specified by an I/O request corresponds to a location within the software system that contains user data;
    upon determining that the location specified by the I/O request corresponds to the location within the software system that contains user data, directing the I/O request to the virtual null device.

2. The method of claim 1, wherein the storage device fulfills I/O requests that are directed to software system metadata by at least one of:
    reading software system metadata from the storage device;
    writing software system metadata to the storage device;
    deleting software system metadata from the storage device.

3. The method of claim 1, wherein the null response comprises at least one of:
    a preconfigured pattern of data;
    logical zeros.

4. The method of claim 1, wherein the storage device comprises at least one of:
    a SCSI target;
    an iSCSI target;
    a Fibre Channel device.

5. The method of claim 1, wherein the storage device and the virtual null device comprise portions of a single device.

6. The method of claim 1, wherein causing the software system to attempt to read data from and/or write data to the dataless storage system comprises configuring the software system to:
    direct I/O requests for metadata within the software system to the storage device;
    direct I/O requests for user data within the software system to the virtual null device.

7. The method of claim 6, wherein creating the dataless storage system further comprises creating a device driver for interfacing between the software system and the storage device and the virtual null device.

8. The method of claim 7, wherein the device driver comprises:
   a SCSI driver;
   an iSCSI driver;
   a Fibre Channel driver.

9. The method of claim 1, wherein the software system comprises:
   a volume manager;
   a file system.

10. The method of claim 1, wherein using the dataless storage system to test at least one aspect of the software system further comprises at least one of:
   using the dataless storage system to test the performance of the software system;
   using the dataless storage system to test the scalability of the software system.

11. A system for creating dataless storage systems for testing software systems, the system comprising:
   a creation module programmed to create a dataless storage system that contains data that is required for the proper operation of software systems but omits all other data, the dataless storage system comprising:
      at least one storage device that fulfills I/O requests that are directed to software system metadata;
      at least one virtual null device that ignores I/O requests that are directed to user data, wherein the virtual null device ignores I/O requests directed to user data by:
         discarding write requests to write to user data; and
         providing null responses to read requests to read user data;
   a testing module programmed to:
      use the dataless storage system to test at least one aspect of a software system by causing the software system to attempt to read data from and/or write data to the dataless storage system;
      determine that a location specified by an I/O request corresponds to a location within the software system that contains user data;
      upon determining that the location specified by the I/O request corresponds to the location within the software system that contains user data, direct the I/O request to the virtual null device;
   at least one processor configured to execute the creation module and the testing module.

12. The system of claim 11, wherein the storage device and the virtual null device comprise portions of a single device.

13. The system of claim 11, wherein the testing module causes the software system to attempt to read data from and/or write data to the dataless storage system by configuring the software system to:
   direct I/O requests for metadata within the software system to the storage device;
   direct I/O requests for user data within the software system to the virtual null device.

14. The system of claim 13, wherein the creation module further creates the dataless storage system by creating a device driver for interfacing between the software system and the storage device and the virtual null device.

15. The system of claim 11, wherein the testing module uses the dataless storage system to test at least one aspect of the software system by at least one of:
   using the dataless storage system to test the performance of the software system;
   using the dataless storage system to test the scalability of the software system.

16. A tangible computer-readable medium comprising computer-executable instructions that, when executed by at least one processor of a computing device, cause the computing device to:
   create a dataless storage system that contains data that is required for the proper operation of software systems but omits all other data, the dataless storage system comprising:
      at least one storage device that fulfills I/O requests that are directed to software system metadata;
      at least one virtual null device that ignores I/O requests that are directed to user data, wherein the virtual null device ignores I/O requests directed to user data by:
         discarding write requests to write to user data; and
         providing null responses to read requests to read user data;
   use the dataless storage system to test at least one aspect of a software system by causing the software system to attempt to read data from and/or write data to the dataless storage system;
   determine that a location specified by an I/O request corresponds to a location within the software system that contains user data;
   upon determining that the location specified by the I/O request corresponds to the location within the software system that contains user data, direct the I/O request to the virtual null device.

17. The method of claim 1, wherein the storage device comprises a physical storage device.

18. The system of claim 11, wherein the storage device comprises a physical storage device.

19. The tangible computer-readable medium of claim 16, wherein the storage device comprises a physical storage device.

* * * * *